United States Patent [19]

Naito

[11] 4,193,949

[45] Mar. 18, 1980

[54] APPARATUS FOR GENERATING FINELY DIVIDED PARTICULATE BUBBLES

[76] Inventor: Makoto Naito, 15-22, Kami-Soshigaya 2-chome, Setagaya-ku, Tokyo, Japan

[21] Appl. No.: 915,140

[22] Filed: Jun. 13, 1978

[30] Foreign Application Priority Data

Jun. 23, 1977 [JP] Japan .............................. 52-81742[U]
Jun. 23, 1977 [JP] Japan .............................. 52-81743[U]

[51] Int. Cl.² .............................................. B01F 3/04
[52] U.S. Cl. ......................................... 261/87; 43/57; 210/219; 261/93; 366/134; 366/165
[58] Field of Search ...................... 261/87, 93, 121 M; 210/219; 209/169, 170; 366/134, 165, 174, 265, 317; 43/57

[56] References Cited

U.S. PATENT DOCUMENTS

| | | | |
|---|---|---|---|
| 1,242,445 | 10/1917 | Ittner | 261/93 |
| 1,354,489 | 10/1920 | Johnson | 261/93 |
| 1,985,153 | 12/1934 | Daman | 261/93 |
| 2,928,665 | 3/1960 | Epprecht | 261/93 X |
| 2,996,287 | 8/1961 | Audran | 261/87 X |
| 3,490,996 | 1/1970 | Kelly, Jr. | 261/87 |
| 3,820,759 | 6/1974 | Hege | 261/87 X |

FOREIGN PATENT DOCUMENTS

| | | | |
|---|---|---|---|
| 281144 | 6/1952 | Switzerland | 261/93 |
| 819785 | 9/1959 | United Kingdom | 261/93 |

*Primary Examiner*—Richard L. Chiesa
*Attorney, Agent, or Firm*—L. Lawton Rogers, III

[57] ABSTRACT

An improved apparatus for generating finely divided particulate gas bubbles in a liquid. The apparatus includes an outer body with a hollow shaft and a cavity defining means carried by the shaft. The shaft is apertured for communication with a gas supply and the cavity is apertured for communication with a liquid supply. The outer body also carried an inner body which includes a shaft and a plurality of vanes. The shaft of the inner body is journaled for rotation within the hollow shaft of the outer body.

4 Claims, 5 Drawing Figures

APPARATUS FOR GENERATING FINELY DIVIDED PARTICULATE BUBBLES

BACKGROUND OF THE INVENTION

This invention relates to an apparatus capable of generating finely divided particulate bubbles in a liquid.

Conventional apparatuses capable of supplying relatively fine bubbles into a liquid are well known. For example, a pneumatic pump for the cultivation of fish, power compressors and the like. However, none of them is free from the disadvantages of low efficiency and large physical size.

To cope with the problems of the conventional apparatuses, this inventor proposed previously a gas-liquid mixing apparatus having a simple construction but a high efficiency. As shown in FIG. 1, two flat plate-like discs $D_1$ and $D_2$ are fitted to the lower end of a straight hollow shaft P with a substantially uniform, relatively narrow gap G between the entire opposed surfaces of these discs in fluid communication with the hollow portion of the shaft P at its radial center. On one surface of either of the discs are disposed equidistantly and radially from the center a plurality of tapered separator plates S, with a proper gap therebetween. A disc $D_3$ having liquid jet sections O formed around the circumference of the disc and is fitted to the separator plates S coaxially with the hollow shaft P.

When the portion of the discs $D_1$–$D_3$ is dipped into a liquid, the hollow shaft P in communication with the gaseous phase is rotated at a high speed by means of a motor, etc., whereby the discs $D_1$–$D_3$ start rotating. Consequently, the liquid present in the gap defined by these discs is imparted with a large kinetic force and caused to flow out towards the circumference of the discs, creating a vigorous flow of liquid from the intake port I of the disc $D_3$ to the jet sections O around the circumference. Due to the high speed revolution, a large negative pressure is generated around the entire outer circumference of the gap G whereby the gas is sucked into the liquid and thus admixed therewith.

In the apparatus described above, the discs $D_1$–$D_3$ are integrated to form a "disc body" and a high level of accuracy is required for the rotary balance of the disc body. Since the disc body is integrally and inseparably formed by the discs via the separator plates S and the shaft P, however, the production of a well-balanced disc body involves considerable technical difficulty. Because of its specific shape, the disc body is by no means easy to mass-produce without causing the increase in the cost of production. Moreover, since the disc body as a whole is rotated in a liquid, it has a large contact surface with the liquid and hence, a large resistance to rotation. Especially, the liquid jet section around the outer circumference of the disc $D_3$ is formed in such a sectional shape as to obtain the effect of an expanded pipe at the time of outflow of the liquid. Since this portion also is rotated with the disc body, it results in the disadvantage that an additional load is applied to a driving source.

It is an object of the present invention to obviate those problems and to provide a novel apparatus which has an improved construction greatly facilitating production techniques, and is able to maintain the gas suction efficiency at a high level to thereby convert the gas into fine particulate bubbles and to admix the bubbles into a liquid.

THE DETAILED DESCRIPTION

Figure 1:
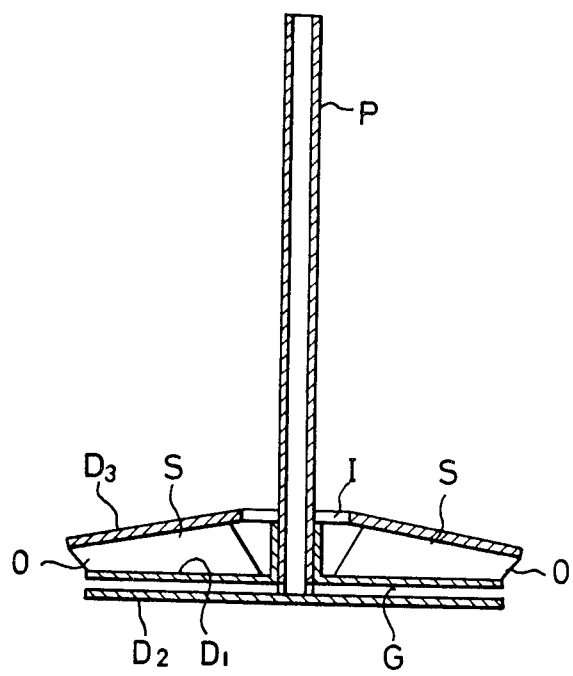
FIG. 1 is a front view in longitudinal section of a conventional apparatus.
Figure 2:
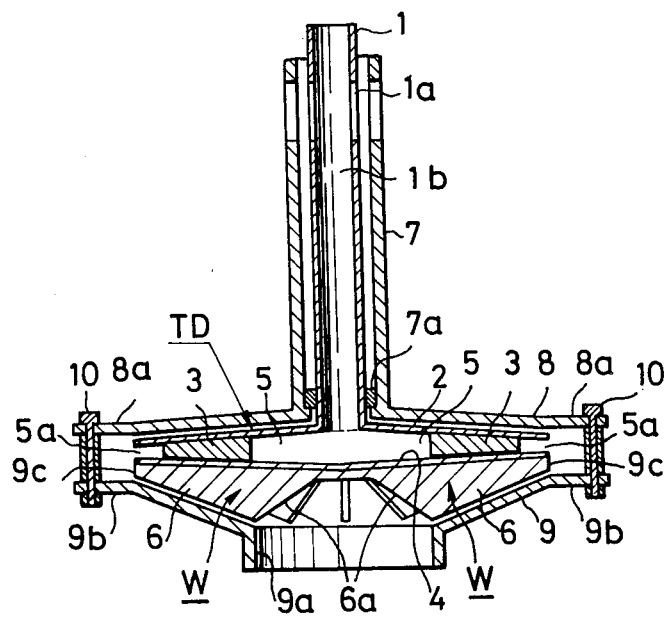
FIG. 2 is a front view in longitudinally section of a first embodiment of the apparatus of the present invention.
Figure 3:
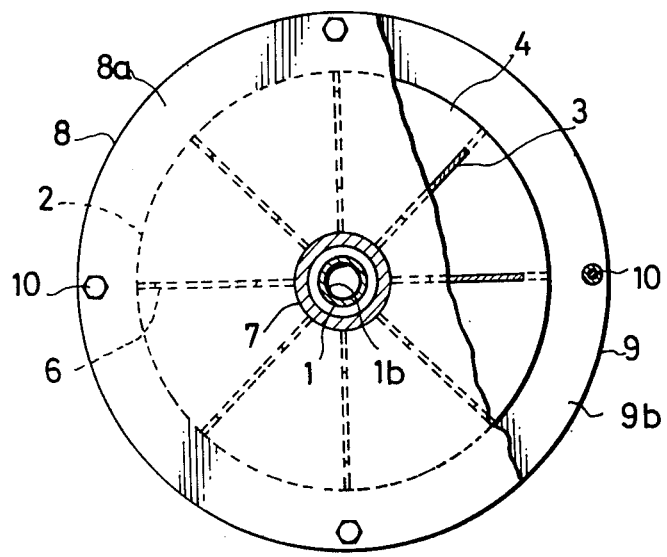
FIG. 3 is a partially cutaway top plan view of FIG. 2.

With reference now to FIGS. 2 and 3, one embodiment of the apparatus of the present invention comprises a hollow rotary shaft of which upper end portion is adapted to be connected to a driving source for rotation such as a motor (not shown); a first disc 2 of a shallow conical shape fitted to the lower end portion of the hollow rotary shaft 1 with the conical plane thereof facing downward; a second disc 4 of a shallow conical shape having a diameter substantially the same as that of the first disc and fitted to the lower surface of the first disc 2 with the conical plane thereof facing upward; a plate spacer 3 having a tapered section of a narrow width at the radially outer tip thereof; a plurality of separator plates 6 each having a tapered portion with a narrow width at its radially outer tip and a length substantially equal to the radius of the first and second discs, the separator plates 6 being disposed equidistantly and radially with the relatively wide portion thereof radially inward of the discs to thereby form with the discs and with the spacer a turning disc body; a first stationary disc 8 of a shallow conical shape greater in diameter than the discs of the turning disc body; and a second stationary disc 9 of a shallow conical shape having a wall plane formed at substantially the same angle as the taper angle of the separator plates 6, the first stationary disc 8 and the second stationary disc 9 being disposed in close proximity to each other so that they do not respectively touch the upper and lower surfaces of the turning disc body and being integrally connected with each other at their circumference by means of bolts 10 or the like to thereby form a stationary disc body, the stationary disc body being connected to the lower end portion of a hollow stationary shaft incorporating therein the hollow rotary shaft rotatably fitted therein.

A gas intake port $1a$ is formed in the upper portion of the shaft 1 and the hollow center portion is used as a gas passage $1b$ for the gas sucked through the intake port $1a$. The upwardly facing upper surface of the second disc 4 is secured to the spacers 3 and integrated with the first disc 2 to form a gap for the introduction of the gas in communication with the gas passage $1b$ of the rotary shaft 1.

Each separator plate 6 has a tapered portion of a narrow width at its radially outer tip and a slanted section $6a$ at the other end. Eight separator plates 6 are conveniently fitted equidistantly and radially with the wide portion facing towards the center of the second disc 4. The elements 1 through 6 together form a turning disc body TD, and the slanted end $6a$ of each separator plate 6 forms a liquid intake port of the turning disc body TD.

The outer shaft 7 which incorporated therein the hollow rotary shaft 1 via a bearing 7a and the like. To the lower end of the outer shaft 7 is fitted the first stationary disc 8 equipped with a flat flange 8a around its outer circumference with the lower surface thereof facing downward in the close proximity to the upper surface of the disc 2 but not in the direct contact therewith. The second stationary disc 9 has a wall of substantially the same angle of inclination as the taper angle of the separator plate 6 and has a liquid intake port 9a at its center and a flat flange 9b around its circumference. This disc 9 is upwardly positioned near the separator plates 6 to such an extent that the upper surface thereof does not touch the ridge of the separator plates 6. The flange 9b of the second stationary disc 9 is connected to the first stationary disc 8 via a bolt 10 or the like.

The gap portion defined by the second disc 4, the separator plate 6 of the abovementioned turning disc body TD and the second stationary disc 9 is used as a liquid flow passage W and the radially outer portion is used as a liquid jet section 9c.

The apparatus of the invention having the abovementioned construction operates in the following manner.

The portion of the turning disc body TD of the apparatus is dipped into a liquid so as to locate the gas intake port 1a of the hollow rotary shaft 1 in fluid in the gaseous phase. When the turning force is imparted to the rotary shaft 1 under this condition, the liquid that has previously filled up the portion interposed by the stationary discs 8 and 9 is provided with a large kinetic energy by rotation of the turning disc body TD and starts flowing radially outwardly vigorously from the jet section 9c. Liquid is continuously introduced from the liquid intake port 9a into the flow passage W and at the same time, the liquid that has been in the gap 5 flows out from the jet section 5a along with fluidization of the liquid inside the flow passage W.

Inside the flow passage W, the fluid vigorously flows out from the intake port 9a to the jet section 9c so long as the turning disc body TD continues to rotate. However, since the section of the tip portion of the flow passage W is shaped in the form of an expanded pipe by the flanges 8a and 9b of the upper and lower stationary discs 8 and 9, the kinetic energy of the liquid jetted from the jet section is converted to a pressure energy. This generates a negative pressure in the proximity of the jet section 9c which sucks the gas of the gaseous phase from the gas jet section 5a into the liquid through the hollow rotary shaft 1 and the gap 5. The gas thus introduced is then subjected to the action of the negative pressure and shear force generated by the liquid jetted from the flow passage W converted into ultra-fine particulate bubbles and admixed into the liquid.

In the apparatus of the present invention operating in the abovementioned manner, the turning disc body TD is covered from above and below by the stationary discs 8 and 9, and the flanges 8a and 9b of the stationary discs 8 and 9 function in the conventional apparatus as the portion of the expanded pipe formed integrally as the turning disc body. To form an apparatus having the same gas suction efficiency as the conventional apparatus in accordance with the present invention, for example, the driving source for rotation may have a smaller output in the present apparatus than in the conventional apparatus. In other words, if the apparatus of the present invention is constructed almost in the same size as the conventional apparatus, the apparatus of the invention provides for a greater suction efficiency.

Since the flow passage W in accordance with the present invention is separably constructed by the turning disc body TD and the stationary disc 9, the balance adjustment of the turning disc body TD during the production, and maintenance and inspection of the apparatus after production become easier in comparison with the conventional apparatus wherein the abovementioned members are integral with each other.

Furthermore, if the liquid intake port is formed on the lower surface of the disc in accordance with the construction of the embodiment described, it become difficult for bubbles jetted from the gas jet section into the liquid and floating therein to be again caught and sucked by the liquid intake port, this resulting in the further improvement in the gas suction efficiency due to the fluidization of the liquid.

Figure 4:
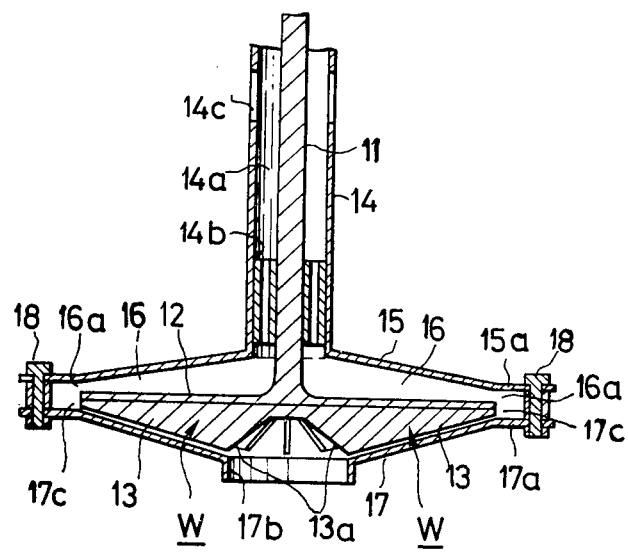
FIG. 4 is a front view in longitudinally section of a second embodiment of the apparatus of the present invention.
Figure 5:
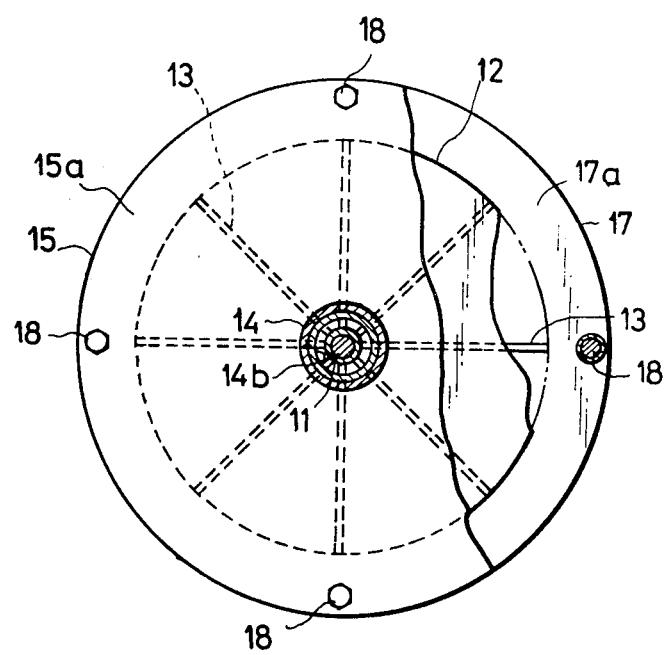
FIG. 5 is a partially cutaway top plan view of the apparatus of FIG. 4.

With reference to the FIGS. 4 and 5 a second embodiment of the present invention includes a rotary shaft of which upper end is adapted to be connected to a driving source for rotation such as a motor (not shown) and a flat platelike rotary disc 12 secured at its center to the lower end thereof. A plurality of separator plates 13 are disposed equidistantly and radially on the lower surface of the rotary disc 12. A preferred embodiment, eight of the separator plates 13 are used whereby the portion 13a of each plate positioned towards the radial center of the rotary disc 12 is slanted and tapered narrowly towards the radially outer end. A hollow cylinder 14 has such a size that is can be loosely fitted to the rotary shaft 11 with a gap 14a between them, to the lower end of the hollow shaft 14 is secured a stationary disc 15 having a downwardly shallow conical shape and equipped with a flat flange 15a around its radial periphery. The stationary disc 15 has, as a whole, a diameter which is greater than the rotary disc 12.

The hollow shaft 14 is loosely fitted to the rotary shaft 11 via a bearing 14b which functions also as a spacer in the arrangement such the section defined between the lower surface of the stationary disc 15 fitted to the shaft 14 and the upper surface of the rotary disc 12 forms a gap 16 which is tapered toward the outer periphery of the discs. The tip of the gap 16 thus formed functions as a gas jet section 16a. A gas intake port 14c may be formed on the hollow shaft 14. A stationary disc 17 having substantially the same hollow conical shape as that of the stationary disc 15, forms a wall at substantially the same angle as the taper angle of the separator wall 13 and is equipped with a liquid intake port 17b at its center and with a flat flange 17a around its circumference. The stationary disc 17 is upwardly positioned near the separator plates 13 to such an extent that the upper surface of its wall does not touch the separator plate 13 of the rotary disc 12. The flange 17a of the stationary disc 17 is secured to the flange 15a of the stationary disc 15 by means of a bolt 18 or the like.

In the above-described construction, a flow passage W for a liquid is defined by the rotary disc 12, the separator plate 13 and the stationary disc 17. The disc 17 has at its tip a liquid jet section 17c which jets the liquid introduced into the liquid intake port 17b by rotation of the rotary disc 12.

In operation, a portion of the discs is dipped into a liquid so as to locate the gas intake port 14c of the hollow shaft 14 in the gaseous phase, and a turning force is then applied to the rotary shaft 11. In this instance, the liquid filling up the gap defined between the discs 15 and 17 is supplied with a large kinetic energy in the flow passage W due to rotation of the rotary disc 17c. At the same time, the liquid is introduced from the liquid intake port 17b into the flow passage W and the liquid that has been in the gap 16 flows out from the jet section 16a along with fluidization of the liquid in the flow passage W.

Meanwhile, in the flow passage W, the fluid keeps vigorously flowing out from the intake port 17b into the jet section 17c so long as the rotary disc 12 keeps rotating. Since the tip portion of the flow passage W, that is, the section defined by the flanges 15a and 17a of the upper and lower stationary discs 15 and 17, is shaped in the form of an expanded pipe, the kinetic energy of the liquid jetted from the jet section 17c is concerted to a pressure energy. This generates a negative pressure in the proximity of the jet section 17c. This negative pressure sucks the gas of the gaseous phase from the gas jet section 16a into the liquid through the hollow shaft 14 and the gap 16, whereby the gas is subjected to the action of the negative pressure. The shear force generated by the liquid jetted from the flow passage W is converted into ultra-fine bubbles and admixed into the liquid.

In the apparatus of the present invention operating in the above-described manner, the rotary disc 12 is covered by the stationary discs 15 and 17 from above and below. Accordingly, its contact surface with the liquid of the liquid phase is made smaller in comparison with the conventional apparatus. Especially, since the expanded pipe portion of the liquid section that has been integrally formed with the rotary disc in the conventional apparatus is formed by the flanges 15a and 17a around the circumference of the stationary discs 15 and 17 in the present invention, the output of a driving source for rotation can also be made smaller than the conventional apparatus provided that the apparatuses have the same gas suction efficiency with each other. In other words, if the apparatus of the present invention has substantially the same size in its construction as the conventional apparatus the present apparatus has a greater gas suction efficiency.

In the apparatus of the present invention, the liquid intake port 17b is defined on the lower surface of the disc portion. This arrangement prevents the bubbles once jetted from the gas jet section 16a and floating up in the liquid from being again sucked into the liquid intake port 17b and this improves the gas suction efficiency arising from the liquidization of the liquid.

Moreover, since the flow passage W is formed by the separable construction between the rotary disc 12 equipped with the separator plates 13 and the stationary disc 17, it is easier in the present invention to make the balance adjustment, to produce and to perform maintenance and inspection in comparison with the conventional apparatus wherein the rotary disc 12 has been integrated with the stationary disc 17.

The above description is illustrative only and it will be readily apparent that variations and modifications of this invention can be made without departing from the principle and spirit of the invention as set out in the appended claims.

What is claimed is:

1. An apparatus for generating finely divided particulate bubbles comprising:
    an outer body including a hollow shaft and a cavity defining means carried thereby, said shaft being apertured for fluid communications with a gas and said cavity being apertured adjacent the axis of said hollow shaft for fluid communication with a liquid, and being apertured for expulsion of an admixture of gas and liquid at a point radially outwardly of the axis of said hollow shaft, the interior of said shaft and said cavity being in fluid communication with each other;
    an inner body including a shaft and a plurality of vanes, said inner body being carried by said outer body with the shaft of said inner body journaled for rotation within the hollow shaft of said outer body, the vanes of said inner body disposed within the cavity of said outer body, said plurality of vanes comprising:
    a generally horizontal disc carried by said inner body and,
    a plurality of paddles extending downwardly along equally spaced radials of said lower disc,
        the spacing between the lower edge of said paddles and the lower internal surface of said cavity defining means being substantially constant,
        said paddles having a wider vertical dimension from a radially intermediate point than at either radial end, and said radially intermediate point being adjacent the radially outer circumference of the aperture in said cavity defining means.

2. The apparatus of claim 1 wherein the shaft of said inner body is hollow and,
    wherein the interior of the hollow shaft of said outer body communicates with the interior of said cavity through the hollow shaft of said inner body.

3. An apparatus for generating finely divided particulate bubbles, comprising:
    a rotary shaft having the upper end thereof adapted for connection to a source of driving rotation;
    a flat plate-like rotary disc carried by the lower end of said rotary shaft, said disc being free of separator plates on the upper surface thereof;
    a plurality of separator plates each carried by said rotary disc on the lower surface thereof and each being tapered from a relatively wider vertical dimension at a point intermediate the radial ends thereof to a relatively narrow vertical dimension of the radially central end thereof and at the radially outer end thereof, said plates being disposed equidistantly apart;
    a hollow shaft;
    a first shallow conical stationary disc having a size sufficient to cover said rotary disc, said stationary disc being carried by the lower end of said hollow shaft with the conical plane thereof facing downward so that the lower surface of said stationary disc and the upper surface of said rotary disc are spaced further apart at the radial center of said discs than at the radially outer end thereof;
    a second stationary disc having a through-hole at the center thereof, said disc being in a shallow conical form at an angle substantially the same as the taper angle of said separator plates towards the outer end thereof, and being carried by said first stationary disc in the proximity of said separator plates but not in the direct contact therewith, the spacing between said separator plates at the outer end thereof and said second stationary disc being constant.

4. An apparatus for generating finely divided particulate bubbles, comprising:

a turning disc body including a hollow rotary shaft of which the upper end portion is adapted to be connected to a source of driving rotation, a first disc of a shallow conical shape fitted to the lower end portion of said hollow rotary shaft with the conical plane thereof facing downward, a plate spacer carried by said first disc, said spacer tapered in cross section from a relatively wider vertical dimension at the radial center to a relatively narrower vertical dimension at the radially outer tip thereof, a second disc of a shallow conical shape having a diameter substantially the same as that of said first disc, said second disc being carried by said plate spacer with the conical plane thereof facing upwardly, a plurality of separator plates carried by said second disc each tapered from a relatively wider vertical dimension at the radial center to a relatively narrow vertical dimension at the radially outer tip, said plurality of said separator plates being disposed equidistantly apart;

a stationary disc body comprising:
a hollow stationary shaft, a first stationary disc of a shallow conical shape greater in size than the discs of said turning disc body, said first stationary disc being carried by said stationary shaft, a second stationary disc of a shallow conical shape having a wall plane formed at substantially the same angle as the taper angle of said separator plates, said first and second stationary discs disposed in close proximity to each other so that they enclose but do not respectively touch the upper and lower surfaces of said turning disc body; and, means for coaxially mounting said hollow rotary shaft internally of said hollow stationary shaft for rotating said turning disc body internally of said stationary disc body.

* * * * *